United States Patent [19]

Lew

[11] Patent Number: 5,002,785

[45] Date of Patent: Mar. 26, 1991

[54] METHOD OF MAKING ENCAPSULATED FOOD PRODUCTS

[76] Inventor: Chel W. Lew, 6220 Culebra Rd., P.O. Drawer 28510, San Antonio, Tex. 78284

[21] Appl. No.: 422,695

[22] Filed: Oct. 17, 1989

Related U.S. Application Data

[63] Continuation-in-part of Ser. No. 277,296, Nov. 29, 1988, Pat. No. 4,880,646.

[51] Int. Cl.⁵ ................................................. A23P 1/08
[52] U.S. Cl. ...................................... 426/303; 426/89; 426/302; 426/309
[58] Field of Search .................. 426/89, 93, 102, 310, 426/302, 303, 309

[56] References Cited

U.S. PATENT DOCUMENTS

| | | | |
|---|---|---|---|
| 4,448,794 | 5/1984 | Wissgott et al. | 426/310 |
| 4,504,502 | 3/1985 | Earle et al. | 426/293 |
| 4,504,504 | 3/1985 | Gaehring et al. | 426/321 |
| 4,715,143 | 12/1987 | Redenbaugh | 47/57.6 |
| 4,767,635 | 8/1988 | Merrit et al. | 426/309 |
| 4,784,862 | 11/1988 | Wotherspoon | 426/103 |
| 4,837,037 | 6/1989 | Kirsof et al. | 426/310 |

Primary Examiner—Donald E. Czaja
Assistant Examiner—D. Workman
Attorney, Agent, or Firm—Sigalos, Levine & Montgomery

[57] ABSTRACT

An encapsulated food product consisting essentially of a solid comestible completely coated with a substantially uniform outer shell of an edible polymer of a type and of a thickness sufficient to prevent the diffusion of flavor and/or color elements from said comestible into a liquid medium or from said liquid medium into said coated comestible, canned or bottled food products containing the same, and the method of making such products.

3 Claims, No Drawings

METHOD OF MAKING ENCAPSULATED FOOD PRODUCTS

REFERENCE TO RELATED APPLICATIONS

The following application is a continuation-in-part of U.S. patent application Ser. No. 277,296 filed Nov. 29, 1988, now U.S. Pat. No. 4,880,646.

BACKGROUND OF INVENTION

The parent application discloses and claims encapsulated popping corn kernels and the method of forming the same. Such process comprises coating at least a portion of the outer surface of kernels of corn with an edible oleagenous substance or edible wax and applying thereover an outer shell of an edible polymer.

The outer coating is one which will retain its integrity until such time as sufficient heat is applied to pop the corn kernel.

For many years it has been known that the processing and storing of food products such as meats, vegetables and fruit either in pieces, slices or whole in liquids as in canning or bottling is not entirely satisfactory. In such canned, bottled, or otherwise stored products there is a loss of color and/or flavor from the food item into the liquid medium such as sauce, brine, fruit juice, syrup, or water, in which the food item is processed and/or stored.

Numerous efforts have been made in order to try to have the freshness of taste and natural appearance of the food products survive processing and storage, but none have been entirely satisfactory. Not only has it not been possible to maintain the original high color and flavor thereof and their palatability, but it has not been possible to prevent them from picking up the flavor and/or color of the liquid in which they are processed and stored or to have their texture altered by such liquid.

Efforts to maintain food product flavor, color and/or texture as by, for example, treating fruit slices with compounds such as ascorbic acid in order to prevent the browning thereof, does not prevent loss of flavor, color, or a change in physical characteristics particularly as the food product is being processed at high temperature.

SUMMARY OF THE INVENTION

The present invention provides novel encapsulated food products which overcome the problems of the prior art and also an economic method for making the same.

Briefly stated, the present invention comprises encapsulated food products consisting essentially of a comestible such as a meat, vegetable, fruit or combinations thereof, in which the comestible is completely covered with a substantially uniform external shell of an edible polymer of a type and of a thickness sufficient to prevent the diffusion of flavor or color elements from said food products into a liquid medium or from said liquid medium into said food products and capable of maintaining its integrity during processing and/or storage in a liquid at elevated temperatures.

The invention is particularly directed to canned or bottled comestibles and to the method of making the same as set forth below.

DETAILED DESCRIPTION

While the novel products and instant process are applicable to any comestible whether whole, sliced, halved, or in some other segmented form, such as sliced meat or meat pieces, whole and sliced vegetable such as peas, carrots, stringbeans, corn, tomatoes, and the like, strawberries, apples, pears, peaches, oranges, and the like, it will be further described herein with special reference to apple slices as illustrative of the invention.

It will be understood that the initial steps in the processing of the food products are those conventionally utilized in preparing the particular food product for canning or bottling, such as cleaning, trimming, paring, segmenting, coring, and/or blanching and the like steps that are usually performed and these are performed on the food products of the instant invention. It is just prior to the time the food product is ready for canning or bottling in a liquid that the product is treated in accordance with the present invention.

More specifically, the food product is coated with a shell of an edible polymeric material capable of forming a hydrophobic layer that will maintain its integrity at the temperature and for the time conditions encountered in conventional canning or bottling operations, i.e., about 170° to 225° F. or slightly above, as in a retort (~250° F.) for at least 20 to 45 minutes. Suitable materials are synthetic or naturally alginates, caseinates, polypectates, insolubilized gelatin, methylcellulose, hydroxypropyl methylcellulose, insolubilized starches, insolubilized hydrocolloids (such as Gellan gum) or mixtures thereof. Preferred are the alginates.

In the case of certain materials such as the alginates it is necessary to incorporate a material capable of hardening the same. With alginates a catalytic material capable of hardening the alginate is used with examples being calcium salts such as calcium acetate, calcium chloride, calcium hydroxide, calcium gluconate, calcium lactate, and other multivalent cationic compounds which will cause the alginate to gel or solidify.

The apple slices can be coated simply by placing them in the liquid polymeric material and after the desired thickness of the capsule layer has been attained, the encapsulated slices are simply removed from the solution, as by screening, rinsed, and dried. The thus encapsulated apple slices can then be processed for canning or bottling or the like in the conventional manner and stored until ready for consumption.

Importantly, the encapsulating layer prevents flavor and color loss by migration of flavor and color from the slices into the liquid such as fruit juice or syrup in which the slices are placed for processing and storage. Also, there is no migration of the sugar or other materials in the juice or syrup into the apple slices and they tend, therefore, to maintain their original integrity and flavor. Moreover, by acting as a barrier for the liquid, such as water, the apple slices tend to remain more firm and not to become as soft as do the apple slices that are not encapsulated when placed in liquid.

It is also possible to incorporate flavor and/or color additives with the hydrophobic shell material to enhance the flavor and/or of the product to the consumer.

It is preferred to use a water insoluble flavoring and/or coloring material, such as an oil to ensure that it will not be leached out of the liquid medium in which the fruit slices are processed or to permit the liquid to enter into the apple by virtue of the fact of the flavored material becoming dissolved thus leaving "holes" in the capsular coating.

The processing steps of canning or bottling are those conventionally used. The coated comestible is simply added to the liquid, placed in the can or bottle, and processed for the conventional time and at the conventional temperature used for the product when uncoated.

As used herein, the phrase "canned or bottled" means preservation of the comestible by heat treatment in a metal, plastic, glass, paper, or the like container conventionally used for canning or bottling.

The process of the instant invention also permits the mass production of the encapsulated fruit pieces. In the instant method, if an alginate is used, the catalyst or hardening compound is added to the fruit slices, as by placing the slices on a continuous conveyor and dusting or soaking (i.e., in solution of catalyst) them with the catalyst followed by adding the thus coated fruit pieces into a solution of or spraying them with the sodium alginate. The catalyst on the fruit then reacts with the alginate in the solution or spray to form the outer encapsulating layer about the fruit slice. This procedure can be carried out either on a batch or on a continuous basis.

In a continuous basis, the slices can be placed on a preforated conveyor belt which, in the case of using alginates and after coating of the slices with catalysts, dips the slices into a bath of the sodium alginate and they are carried therethrough to ensure entire coating of all the slices. A belt then removes the coated fruit pieces from the bath and conveys them to and through a drying zone for a time sufficient to dry the same so that they can be further processed, as noted above, by being placed in the liquid medium and then in a container for the conventional final canning or bottling processing steps.

The thickness of the encapsulation layer is not critical as long as it is thick enough to maintain its integrity about the fruit pieces. It will be evident that the thickness should not be too great as to alter the flavor of the product. Also, it should not be too thick particularly if a flavoring material is admixed therewith so as to overpower the taste of the fruit.

Preferably, the thickness of the encapsulating layers should be about 10 to 30$\mu$m in thickness, it being understood that the thickness can vary therefrom as long as the desired characteristics of the encapsulated product are maintained; i.e., the complete coating thick enough to isolate the product from its surrounding environment during and after processing, but not too thick as to give an adverse flavor and/or texture to the product.

As to the water insoluble flavoring and/or coloring materials they are preferably oils that are suitable for the particular fruit slice being processed, i.e., peach flavoring or coloring for peaches, strawberry flavoring or coloring for strawberries, apple flavoring for apples, and so forth. It is understood that ascorbic acid to prevent browning in the fruit and the fruit is treated therewith in the usual manner and in the usual amounts prior to encapsulation.

The invention will be further described in connection with the following example which are set forth for purposes of illustration only.

EXAMPLE 1

Fresh cut apple pieces were completely dusted with calcium acetate and then placed into a 2 wt. % sodium alginate solution for a period of approximately two minutes.

A thin alginate outer coating was formed about the apple pieces which were then removed from the alginate solution, rinsed with water, and permitted to dry at room temperature. The coated pieces were dry dried in about 12 hours and upon examination the apple pieces had a substantially uniform coating of the alginate about the entire piece.

The coating survives in a heated liquid medium ($\sim$180° F.) for five minutes preventing the liquid from contacting the apple slices.

EXAMPLE 2

The same process of example one was followed except that calcium gluconate was utilized in place of the calcium acetate.

Again, uniformly coated apple pieces were obtained.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. The method of making a canned or bottled food product comprising a liquid and at least one solid comestible comprising preparing the comestible for canning or bottling and prior to placing said comestible in said can or bottle with said liquid, completely coating said comestible with powdered catalyst for hardening an edible polymer selected from an alginate or, caseinate, applying a coating of said edible polymer over said catalyst coating of a thickness sufficient to prevent the diffusion of flavor and/or color elements from said comestible into a liquid medium or from said liquid medium into said coated comestible, then placing said encapsulated comestible in said can or bottle and sealing the same, and completing the canning or bottling.

2. The method of claim 1 wherein the comestible is a fruit and said polymer is an alginate.

3. The method of claim 1 or 2 wherein the shell is an alginate having a thickness of about 10 to 30 $\mu$m.

* * * * *

UNITED STATES PATENT AND TRADEMARK OFFICE
CERTIFICATE OF CORRECTION

PATENT NO. : 5,002,785

DATED : March 26, 1991

INVENTOR(S) : Lew

It is certified that error appears in the above-identified patent and that said Letters Patent is hereby corrected as shown below:

On the title page, item [73] Assignee:

insert --Southwest Research Institute--

Signed and Sealed this

Thirteenth Day of October, 1992

*Attest:*

DOUGLAS B. COMER

*Attesting Officer*      *Acting Commissioner of Patents and Trademarks*